United States Patent [19]

Krasij et al.

[11] 4,454,565
[45] Jun. 12, 1984

[54] ADAPTER PLATE ASSEMBLY FOR CIRCUIT BREAKER

[75] Inventors: Bohdan Krasij, Avon; Charles Mune, West Hartford, both of Conn.

[73] Assignee: Carlingswitch, Inc., West Hartford, Conn.

[21] Appl. No.: 424,509

[22] Filed: Sep. 27, 1982

[51] Int. Cl.³ .............................................. H02B 1/04
[52] U.S. Cl. ................................... 361/376; 200/295; 200/296; 361/363
[58] Field of Search ............... 361/346, 353, 363, 368, 361/376, 380, 417, 358, 360, 361; 174/66, 53, 52 R; 200/296, 293, 295, 292; 248/27.1, 27.3

[56] References Cited

U.S. PATENT DOCUMENTS 3,398,249 8/1968 Dessert ........................... 361/363 X
3,453,408 7/1969 Mune .................................... 200/295

Primary Examiner—J. V. Truhe
Assistant Examiner—Greg Thompson
Attorney, Agent, or Firm—McCormick, Paulding & Huber

[57] ABSTRACT

A circuit breaker and mating adapter plate combine to fit a panel opening intended to receive larger breakers. The adapter plate has one resilient and one rigid leg, each with inturned lips so that the adapter can be clipped onto the face of the breaker. One mounting screw utilizes a conventional threaded opening in the breaker, the other attaches to the adapter only.

4 Claims, 7 Drawing Figures

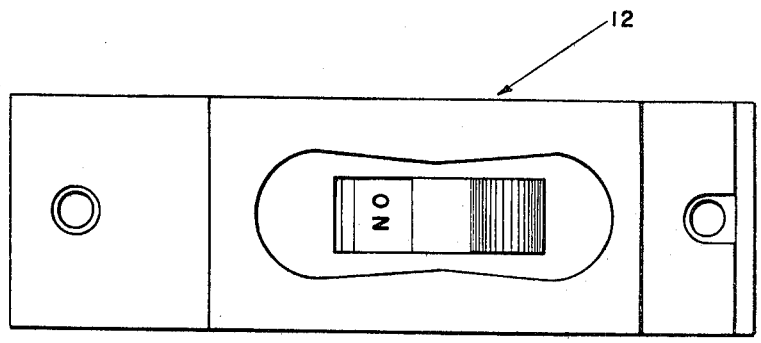
FIG. 3
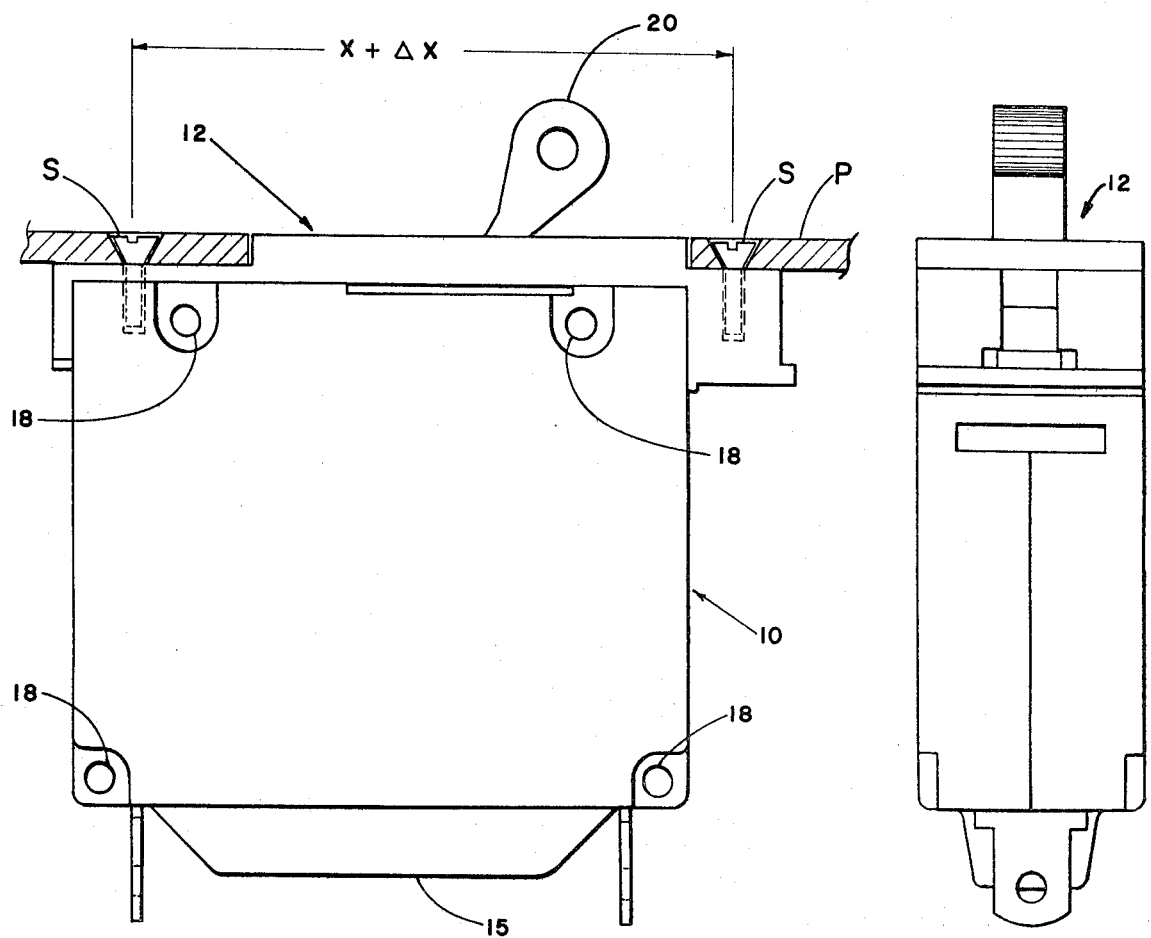
FIG. 2
FIG. 4

ADAPTER PLATE ASSEMBLY FOR CIRCUIT BREAKER

This invention relates generally to the mounting of circuit breakers in panel openings, and deals more particularly with an adapter plate assembly for securing a circuit breaker in an oversize panel opening.

The general object of the present invention is to provide an adapter plate for a relatively small circuit breaker such that the small breaker is usable in a larger size panel opening which may be of different configuration, so that a small circuit breaker normally mounted in a circular panel opening can be fitted with the adapter plate and mounted in a rectangular panel opening of the type adapted to receive larger size circuit breakers.

In its presently preferred form the adapter plate assembly of the present invention is suited for use with a circuit breaker having a front face with a raised cylindrical boss adapted to fit a circular panel opening such that two threaded openings in the circuit breaker front face are adapted to receive two mounting screws spaced from the boss, and spaced from one another by a distance X. The adapter plate assembly comprises a generally U-shaped plastic member with at least one resilient leg end portion adjacent one end, and having an opposite leg end portion which cooperates with the resilient leg portion to define a rearwardly open recess of rectangular configuration for receiving the front face of the breaker. The adapter plate leg portions each have inturned lips for entry in openings provided for this purpose in the ends of the circuit breaker housing. The opposite leg end portion of the adapter is relatively rigid and projects beyond the end of the breaker to define an opening in which a metal insert is provided for threadably receiving a mounting screw which screw is spaced at a distance greater than X (X+ΔX) from the first of the two threaded opening provided in the circuit breaker housing. The front face of the adapter plate defines a generally rectangular raised portion for fitting the rectangular panel opening. A small opening aligned with the one threaded opening in the circuit breaker housing is also defined in the adapter plate so as to receive one of the two mounting screws in a manner such that the screw can be threadably received in the threaded opening provided in the breaker itself. The circuit breaker itself is preferably formed from two half case housing parts, and said one threaded opening in the circuit breaker housing also comprises a metal insert defining a female thread for receiving one of the two mounting screws. The metal insert in the adapter plate receives the other mounting screw when the breaker and adapter plate are provided in the alternative mounting environment described above.

FIg. 2 is a side elevational view of the breaker and adapter plate assembly mounted in a panel opening.

FIG. 3 is a top plan view of the assembled adapter plate and circuit breaker.

FIG. 4 is an end view of the assembled adapter plate and circuit breaker.

FIG. 8 is an end view of the adapter plate assembly.

Figure 1:
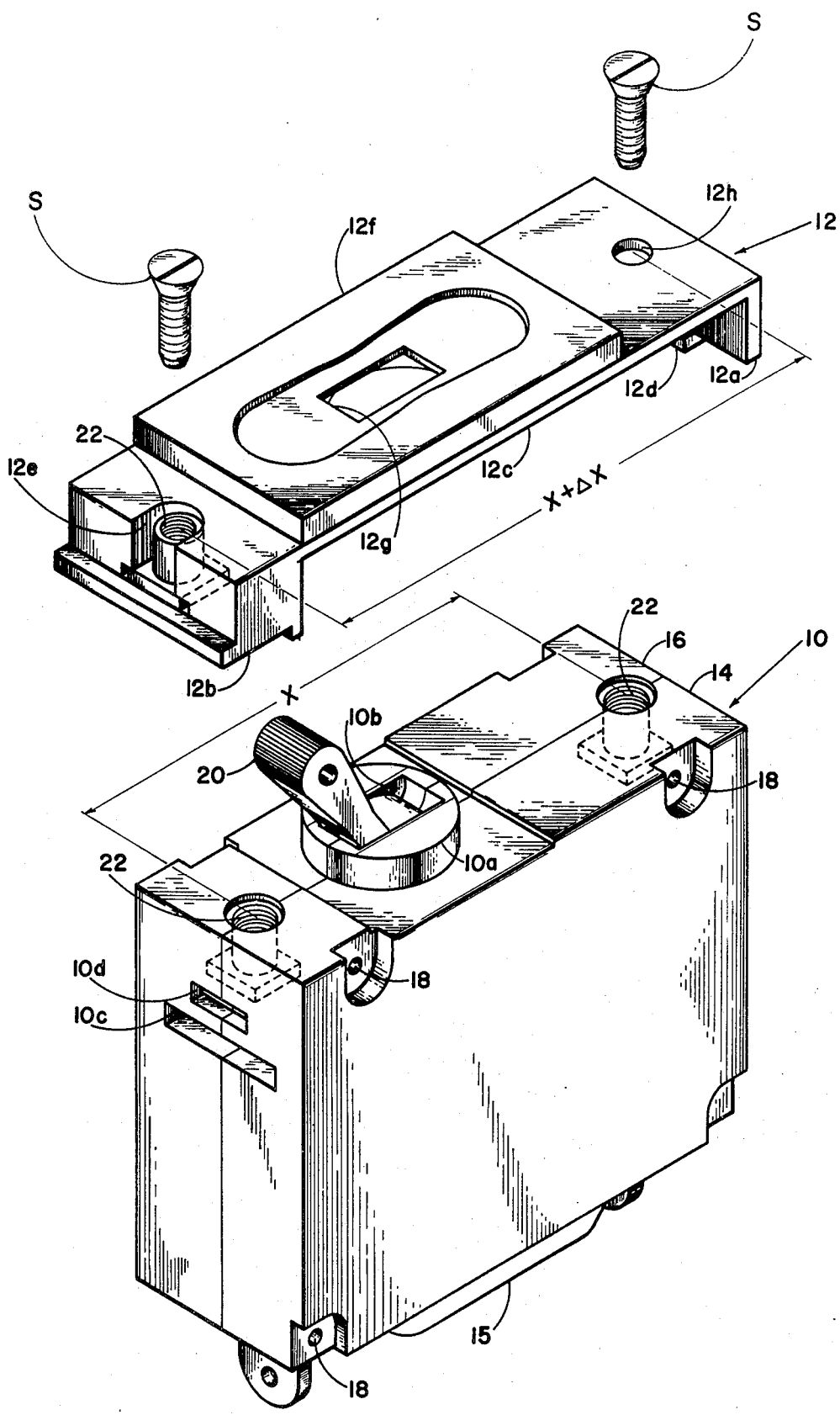
FIG. 1 illustrates a conventional circuit breaker and adapter plate assembly of the present invention shown in exploded relationship thereto.

Turning now to the drawings in greater detail, a conventional circuit breaker is indicated generally at 10 together with an adapter plate assembly 12 constructed in accordance with the present invention and designed to be assembled with the breaker 10 so as to be conveniently mounted in a panel P as best shown in FIG. 2.

The circuit breaker 10 may be fabricated from two half case housing parts 14 and 16 which are mated and secured together by fasteners such as rivets provided in the holes as suggested at 18. The housing includes a front face with a raised cylindrical boss 10a defined in part by each of the split case parts 14 and 16, and the boss 10a defines an opening 10b through which the operating member or handle 20 of the breaker projects. An air ventilation opening 10c may be provided as shown in the circuit breaker housing. It is an important feature of the present invention that openings 10d, 10d (one shown in FIG. 1) are provided in the ends of the circuit breaker housing for receiving inturned lips 12d, 12d provided for securing the adapter plate assembly 12 to said circuit breaker 10 to be described. These openings 10d, 10d in the opposite end walls of the housing of the circuit breaker 10 must be provided in the otherwise conventional breaker in order to asssemble and secure the adapter plate 12 therewith.

Still with reference to the conventional circuit breaker 10, metal inserts 22, 22 are generally provided in openings or slots in the circuit breaker housing parts 14 and 16 at assembly of the breaker itself so as to threadably receive mounting screws or the like when the breaker is mounted in a conventional panel having a circular opening for receiving the boss 10a. Such a panel will also have openings provided therein for receiving the mounting screws and it is a feature of such breaker mounting techniques that these openings will be spaced a distance X from one another so as to suitably align a conventional breaker such as that shown at 10 in a standard breaker panel.

The chief aim of the present invention is to provide a convenient means for mounting the circuit breaker 10 in a rectangular panel opening where the spacing between the mounting holes is not the same as depicted at X in FIG. 1 but wherein the mounting holes in the panel are spaced a distance greater than X (X+ΔX) as suggested in FIG. 2. It will be apparent from FIG. 2 that this distance X+ΔX is greater than longitudinal dimension of the circuit breaker 10 and that the opening of the panel rather than being circular to mate with the boss 10a of the breaker 10 is instead rectangular and larger in size to receive the raised portion of a larger circuit breaker (not shown).

The adapter plate 12 has a rearwardly open recess 12c for receiving the front face of the circuit breaker 10 and this rearwardly open recess is more particularly defined by leg portions 12a and 12b integrally formed in the plastic adapter plate 12. One of these leg portions 12a and this end portion of plate 12 are so dimensioned as to be resiliently deformable during assembly of the adapter plate with the breaker, and the opposite end portion 12b is much more massive and defines an opening 12e which is adapted to receive a metal insert 22 similar to those used in the conventional circuit breaker 10 for threadably receiving a mounting screw. Each of these leg portions 12a and 12b defines inturned lips, as shown at 12d in FIG. 1, for being received in the openings 10d, 10d in the circuit breaker housing as described above.

The plate 12 is molded from an electrically insulative plastic material.

Figure 5:
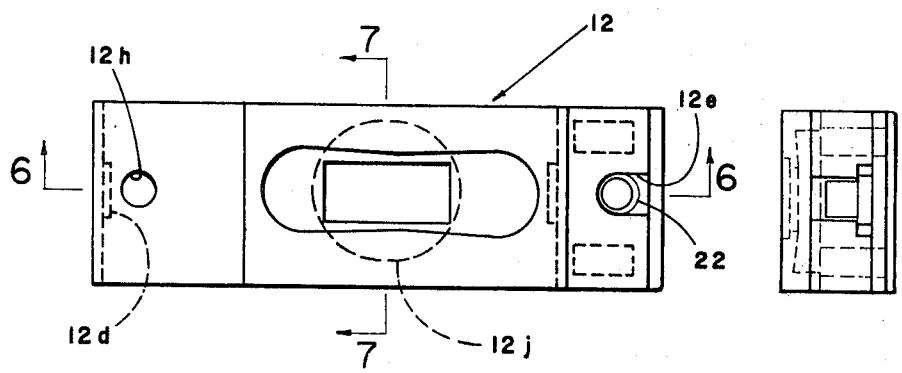
FIG. 5 is a plan view of the adapter plate assembly.
Figure 7:
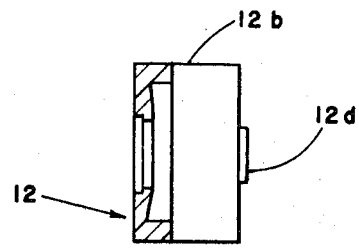
FIG. 7 is a sectional view taken generally on the line 7—7 of FIG. 5.
Figure 6:
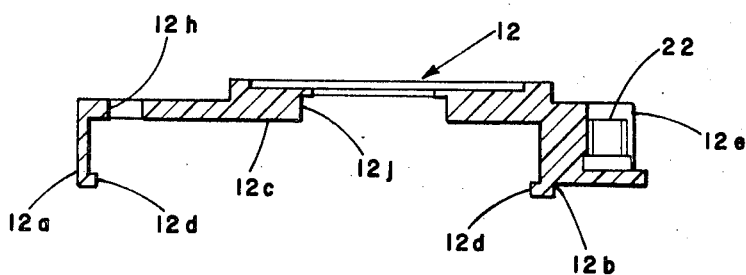
FIG. 6 is a sectional view taken generally on the line 6—6 of FIG. 5.

Still with reference to the adapter 12 the front face of the adapter plate defines a raised rectangular portion 12f which is so dimensioned as to fit the rectangular opening normally provided in a panel P of the type for receiving larger size circuit breakers for which the breaker 10 with adapter plate 12 is a replacement. A clearance opening 12g is provided to permit movement of the handle 20 of the breaker 10 when the adapter plate 12 is assembled with the breaker 10 as shown in FIGS. 2, 3 and 4. The opening 12e for receiving the threaded metal insert 22 is preferably undercut as shown in FIGS. 5, 6 and 8 so as to forcibly and slidably receive the insert 22 upon assembly of the insert to its adapter plate as a result of raised portions 12k, 12k as best shown in FIGS. 1 and 5. Thus, one mounting screw S is used to assemble the resilient leg defining end of the adapter plate and housing to one another and to anchor the assembled breaker and adapter plate in a panel P as best shown in FIG. 2. This screw is received in an opening 12h of the adapter and is threadably received in the underlying insert 22 provided in the breaker housing 10. Another screw is provided in the more rigid end of the adapter as shown in FIG. 2.

When the adapter plate 12 is assembled with the breaker 10 the raised cylindrical boss 10a of the breaker will be received in a rearwardly opening recess 12c defined in the rear face of the adapter plate as suggested at 12j in FIGS. 5 and 6. The two mounting screws securely hold the breaker and plate in the panel. The screw in opening 12h will compress the plate 12 between the panel P and the breaker 10 as shown in FIG. 2. Assembly and or disassembly of the breaker and adapter plate can be accomplished by grasping the end portion 12b of the adapter plate and lifting the adapter plate away from the housing so as to flex the resilient end portion of the adapter plate 12 as described above.

I claim:

1. In combination, a circuit breaker and an adapter plate assembly for securing the circuit breaker in an oversize panel opening, said circuit breaker having opposite end faces and a front face with a raised boss adapted to fit a small panel opening, said front face also having two threaded openings for receiving two mounting screws spaced from the boss and spaced from one another by a distance (X), said adapter plate assembly including a U-shaped adapter plate of one piece plastic with a resilient integrally formed leg portion at one end and an opposite leg end portion which cooperates with said resilient leg portion to define a rearwardly open recess for receiving said circuit breaker front face as a result of bending back said resilient leg end portion, said adapter plate leg portions having integrally formed inturned lips for entry in openings provided in said end faces of said circuit breaker to secure said plate to said circuit breaker, said opposite leg end portion of said adapter plate having a projection defining an opening, and a metal insert provided in said opening for receiving a mounting screw which is spaced a distance $(X+\Delta X)$ greater than X from one of said two threaded openings in said circuit breaker front face.

2. The adapter plate assembly and circuit breaker combination of claim 1 wherein said adapter plate has a front face defined in part by said projection of said opposite leg end portion, and said adapter plate front face defining a raised portion adapted to fit a larger panel opening, and an opening in said front face opposite said one of said two threaded openings in said circuit breaker front face to provide access to said one of said two threaded openings in mounting said assembly in a panel.

3. The adapter plate assembly and circuit breaker combination of claim 2 wherein said circuit breaker has mating half case housing parts and wherein said two threaded openings each comprise metal inserts provided in aligned openings of the circuit breaker half case parts, said metal insert in said adapter plate projection being forcibly received in an end opening provided at the opposite end portion of said adapter plate.

4. The adapter plate assembly and circuit breaker combination of claim 3 wherein said raised boss on said front face of said circuit breaker is of generally cylindrical configuration to be received in a circular panel opening, and wherein said rearwardly open recess includes a portion for receiving said cylindrical circuit breaker boss, said adapter plate front face raised portion having a generally rectangular shape to be received in a generally rectangular panel opening.

* * * * *